(12) United States Patent
Chang et al.

(10) Patent No.: US 7,098,776 B2
(45) Date of Patent: Aug. 29, 2006

(54) METHODS AND APPARATUS FOR VIBROTACTILE COMMUNICATION

(75) Inventors: Angela Chang, Cambridge, MA (US); Hiroshi Ishii, Boston, MA (US); James E. Gouldstone, Cambridge, MA (US); Christopher Schmandt, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 83 days.

(21) Appl. No.: 10/825,012

(22) Filed: Apr. 15, 2004

(65) Prior Publication Data
US 2004/0207542 A1    Oct. 21, 2004

Related U.S. Application Data

(60) Provisional application No. 60/463,272, filed on Apr. 16, 2003.

(51) Int. Cl.
*H04B 3/36* (2006.01)

(52) U.S. Cl. .............................. 340/407.1; 340/407.2; 341/20; 341/21

(58) Field of Classification Search ............. 340/407.1, 340/407.2; 341/20, 21
See application file for complete search history.

(56) References Cited

U.S. PATENT DOCUMENTS 4,905,001 A * 2/1990 Penner .................... 341/20

* cited by examiner

*Primary Examiner*—Daryl C Pope
(74) *Attorney, Agent, or Firm*—Charles G. Call

(57) ABSTRACT

A device for enhancing interpersonal communication over distance through use of touch. A vibrotactile (touch-and-vibration) interface is used to improve existing remote communication by allowing tactile cues to augment the audio-visual information in real-time. The pressure exerted by each finger of the transmitter produces patterns of vibration against the corresponding finger of the receiver. A hand-held device using the interface allows a user to transmit and receive patterns of vibration to and from a remote user and signify tactile gestures, or expressive uses of touch.

12 Claims, 4 Drawing Sheets

# METHODS AND APPARATUS FOR VIBROTACTILE COMMUNICATION

CROSS REFERENCE TO RELATED APPLICATIONS

This application is a non-provisional of U.S. patent application Ser. No. 60/463,272 filed Apr. 16, 2003, and claims the benefit of the filing date thereof.

FIELD OF THE INVENTION

This invention relates to methods and apparatus for communicating using the sense of touch.

BACKGROUND OF THE INVENTION

Conventional communication systems allow people to connect to each other in real-time while being physically separated. The ability to instantaneously exchange sound, text and images over great distances has become almost commonplace. However, commercial communication devices do not ordinarily convey a sense of touch. With rare exceptions, communicating using touch only occurs when people are face-to-face.

Touch conveys meaning and information in interpersonal communication. Touch acts as an extension of the physical body. Hand shakes between business partners signify agreement and commitment, the supportive squeeze of your hand by a friend, or even a quick tap of interruption from a stranger conveys a wealth of contextual information that is rarely present in real-time remote interpersonal communication. The goal of "reaching out to touch someone" suggests that touch is a powerful and meaningful part of interpersonal communication.

It is accordingly a principal object of the present invention to use touch to communicate between people at remote locations, and to use touch signal transmission to enhance conventional forms of communication, such as voice telephony.

SUMMARY OF THE INVENTION

In its preferred embodiments, the present invention takes the form of methods and apparatus that allow people to communicate with one another at a distance through use of touch. A vibrotactile (touch-and-vibration) interface is used to provide remote communication, or improve existing remote communication, between individuals. The system transmits tactile signals which can have independent meaning or which can augment the audio-visual information provided by a conventional communications system.

The invention employs sensors for detecting the amount of pressure exerted by the fingers of the human sender's hand and produces patterns of vibration against the corresponding fingers of a remotely located human receiver's hand. This device permits the exchange of multiple, analog time-varying vibrations between two users. The vibration patterns may signify tactile gestures or expressive uses of touch.

The invention may be implemented by the combination of an actuator that is responsive to manipulation by a human sender at a sending location for generating an output signal indicative of the nature of the manipulation, a transmission channel for conveying the output signal from the sending location to a remote location, and a vibration source at the remote location for receiving the signal and producing corresponding vibrations perceptible to a human receiver which are indicative of the nature of the original manipulation by said human sender.

The transmitted output signal preferably indicates activity by said human sender at a first set of different positions. The vibration source at the receiving end produces vibrations which are perceptible by the human receiver at a second set of different positions which correspond to said first set of different positions. To achieve this, a pressure sensor may be positioned at or near the fingertip of one or more of the senders fingers, and output vibrators may be positioned on the corresponding one or more fingers of the receiver's hand, so that an action by a particular one of the sender's fingers causes a vibration to be sensed on the corresponding one of the receiver's fingers.

A vibration source may also be used to apply a feedback stimulation in response to an action by the sender that is felt by the sender. In this way, the sender can feel a vibration like that the receiver will feel, and thus better understand and control the nature of the touch signals communicated to the receiver.

The invention may be implemented by placing pressure sensors and output vibration sources on or near the surface of a device which may be grasped by the user. The device may be shaped to anatomically conform to the precision grip position of the human hand employed during manipulation of the device. Ergonomic ridges and indentations on the surface of the device help position the fingers of the hand properly with respect to the sensors and vibration sources. The device may take the form of a shaped housing of a telephone hand piece which is also used to house a conventional telephone or cellular phone voice communication apparatus, with the voice signals and the signals which produce vibrotactile outputs being transmitted concurrently between the parties to the telephone conversation.

These and other features of the invention may be better understood by considering the following detailed description of a preferred embodiment of the invention. In the detailed description which follows, frequent reference will be made to the attached drawings.

DETAILED DESCRIPTION

The preferred embodiment of the invention, called "ComTouch," is a tactile communications system in which one or more actuators manipulated by a human sender generate an output signal sent via a transmission channel to a remote location where it is used to control a stimulator that produces vibrations perceptible to a human receiver that indicate the nature of the original action performed by the human sender.

In the preferred embodiment, the system translates pressure applied by the sender's fingers into vibrations felt by the receiver's hand. The pressure applied by each of the sender's fingers is translated into an electrical signal value that is transmitted to a remote location where it is used to control a vibratory stimulus applied to the corresponding finger of the receiver's hand. The personal nature of the resulting touch communication allows the parties to impart physical, nonverbal information to their communications, and may be used to advantage to supplement or enhance conventional telephony voice conversations.

Figure 1:
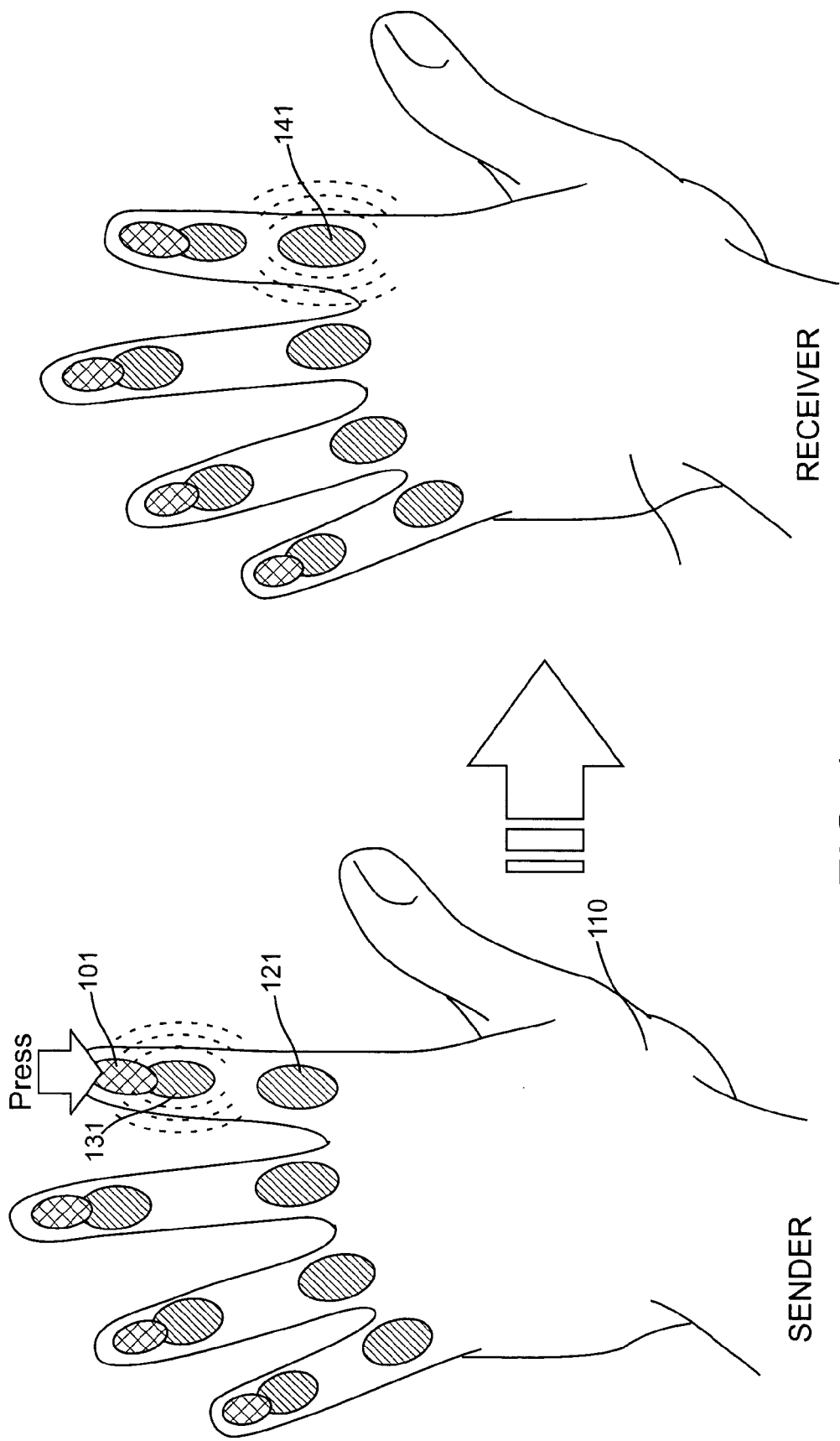
FIG. 1 illustrates the placement and function of pressure sensors and vibration sources on the hands of a human sender and a human receiver of vibrotactile signals.

The tactile communications method contemplated by the invention is generally illustrated in FIG. 1. Both parties are provided with identical tactile communications devices which work in the same way, permitting both parties to both send and receive touch signals. FIG. 1 illustrates how an individual touch signal is generated in response to pressure applied by the fingers of a human "sender" and sent to the hand of a human "receiver." Touch signals are produced by sensors that detect pressure applied by each of the sender's fingers. The output signals from the pressure sensing sensors are sent as electrical signals (analog or digitial) over a transmission pathway to a remote receiver where they are converted into vibrations which are sensed by the human receiver.

Both the pressure sensors and the vibratory stimulators engage with the fingers on the front of the hand where the skin is sensitive to touch signals and where a controlled amount of pressure can be applied. A pressure responsive input sensor is placed near the tip of each finger as illustrated in FIG. 1 by a sensor located at 101 on the sender's index finger. A first vibrating "feedback" stimulator 131 is positioned on the same finger near the pressure sensor. A second vibrating "receiving" stimulator is positioned near the base of each finger as indicated at 121.

When pressure is applied to the input sensor at 101 by the sender's index finger, a signal is transmitted to the receiving stimulator 141 on the index finger of the receiver's hand, causing it to vibrate. At the same time, the sender feels a similar "feedback" vibration produced by the stimulator located at 131, confirming to the sender what the human receiver is experiencing. The input pressure sensor at 101 is positioned at the fingertip because the flexor muscles of the hand have the dynamic physical range needed to easily and accurately control a downward pressure at the fingertips. In order to approximate a coincidence of input and output, the feedback stimulator (as compared to the receiving stimulator) is positioned at 131 close to the source of actuation at the fingertip. The feedback and receiving stimulators are positioned on the middle and base of the front surface of the finger, as this area provides the needed contact surface at a touch sensitive location.

The tactile communication capability provided by the device may be used to enhance the communications provided by a conventional communications system, such as wired or cellular telephone link. The device may be incorporated into a wired telephone handset, or a cellular telephone, with the transducers being positioned to engage with individual fingers of the user's hand. Alternatively, the device may be implemented by an accessory cover that fits over an existing handset, or the sensors may be placed in a glove worn on the user's hand. The resulting configuration of sensors, illustrated by the handset shown in FIGS. 2 and 3, enables users to augment audio (spoken) communication by transmitting and receiving "touch signals."

Figure 3:
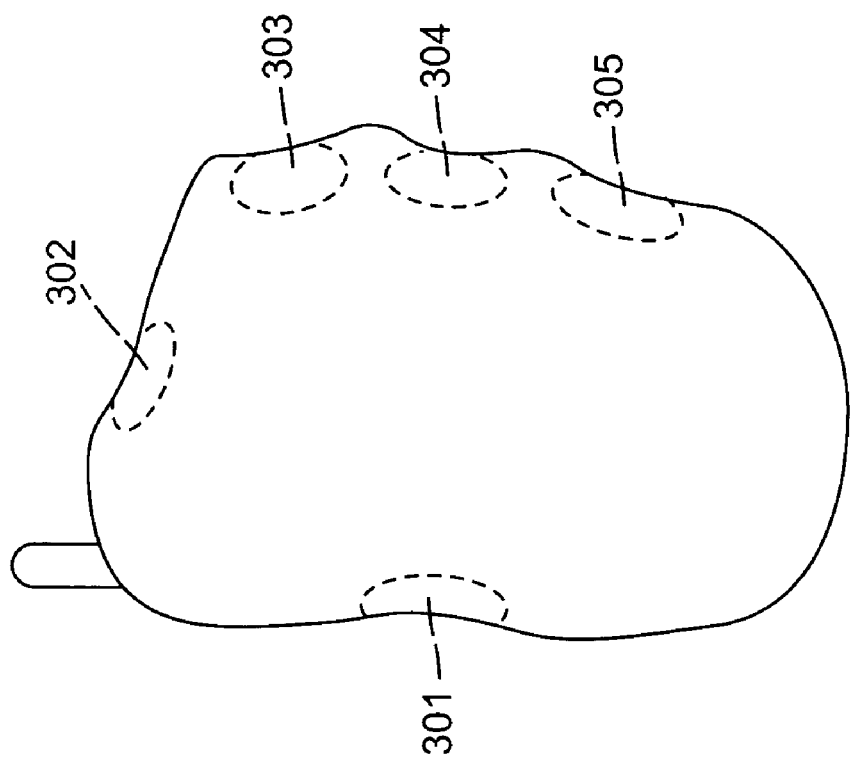
FIG. 3 is a rear elevational view of the shaped cellular phone housing seen in FIG. 3.
Figure 2:
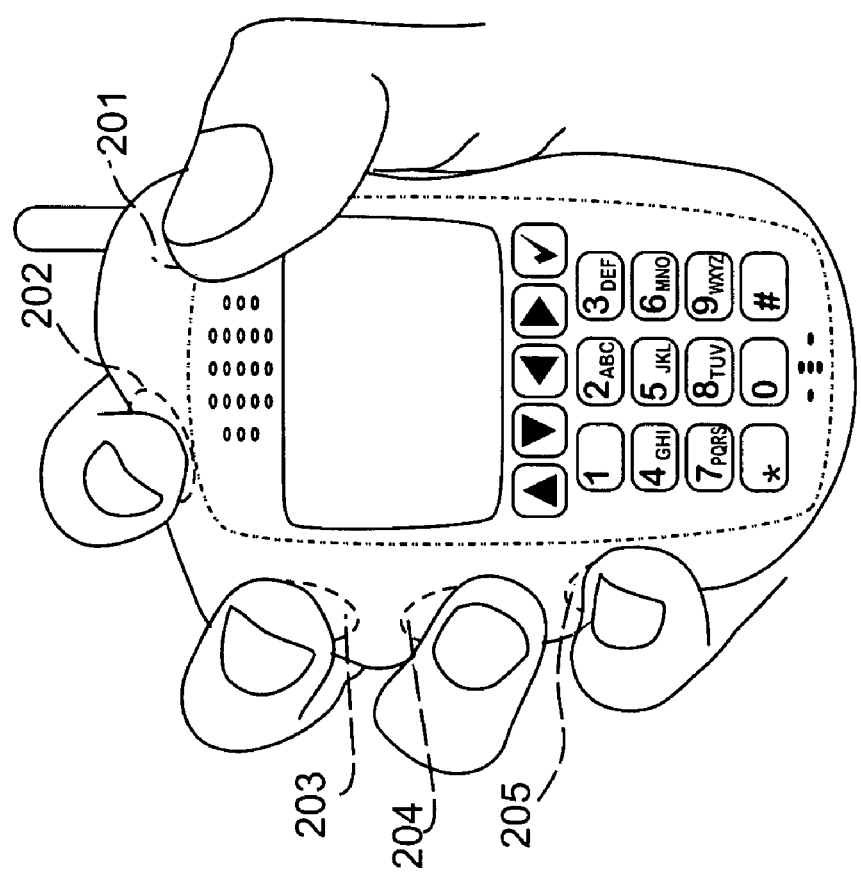
FIG. 2 shows the front elevational view of a shaped cellular phone housing fitted with pressure sensors and vibration sources which engage the fingers of the user's hand.

FIGS. 2 and 3 are front and rear views, respectively, of a handset whose exterior is shaped to conform to the user's right hand when the handset is held in the normal fashion. Five pressure sensors are positioned on the surface of the handset at locations shown in FIG. 2 at 201–205, with each sensor being placed to engage with the fingertip of one of the user's fingers (as illustrated at 101 in FIG. 1). The pressure sensors are thus positioned where they may be easily manipulated by the ends of the user's four fingers and thumb as seen in FIG. 2.

Five vibratory stimulators seen at 301–305 are positioned on the rear surface of the handset where they engage with the base of the user's five fingers (in the location illustrated at 121 in FIG. 1). Five additional vibrating stimulators (not shown) which provide feedback to the user and are positioned near the pressure sensors 201–205 respectively to engage with the ends of the user's fingers and thumb as illustrated at 131 in FIG. 1.

Like the telephone and face-to-face communication, the device provides touch communication that is both bi-directional and asynchronous. Each device both sends and receives touch signaling information, and touch signals flow in both directions over the communications link. The touch signaling is asynchronous in that touch signals can be both sent from and received by each device simultaneously, and no protocol is used (or needed) to govern when a user may transmit or receive information. Touch signals between the parties may accordingly coincide, overlap or be used to interrupt one another.

Unlike the telephone, which uses audio signaling for both the input from the user and the output to the user, the tactile communications system contemplated by the invention uses an asymmetric input and output. The invention maps the magnitude of input pressure applied by the sender to an output vibrational stimulus perceived by the receiver. In addition, in order to better communicate nonverbal expressive content, the device transmits continuous, time-varying signal values rather than discrete (ON/OFF) data. Variations in the pressure applied by the human sender's finger or fingers is manifested as corresponding variations in the intensity and frequency of the vibratory stimuli perceived by the receiver.

Thus, the preferred embodiment of the invention is characterized by the use of bidirectional, asynchronous transmission of continuous time-varying touch information transferred via an asymmetric interface. As used here, the term "asymmetric" means that the input and output are manifested in different forms; specifically, the input is manifested by an applied force while the output is manifested as a vibration.

Metaphor of Hand Gestures

The concept of this handheld device was inspired by the communication metaphor of shaking hands, a nonverbal interaction where the information is characterized by the physical nature of the contact between participants. The hand provides a compact site on the body for tactile input and output, and closing the sensory loop at a localized member of the body means that no extra sensory augmentation is required to both send and receive signals. The fingers exhibit a good sense of touch for receiving vibratory signals of varying intensity, and can apply pressure to an input sensor with precisely controlled intensity. The choice of the hand as the interface also allows separate transducers to be placed on several fingers (which may include the thumb), and each finger is used as a site of both actuation and reception. The front surfaces of the fingers possess a high density of touch receptors, while the independent motor control of each finger permits individual pressure sensors to be separately actuated.

The preferred embodiment of the invention uses all five fingers (i.e., four fingers and the thumb) to maximize the sensory capacity of the hand to send and receive information. Engaging as much of the hand as possible would allow more physical expression. Because it is desired to provide a representation of physical gestures, such as the nuances of squeezing and motion, a close physical mapping between the fingers and the device inputs and outputs will more adequately convey physical information.

Mechanical representations of touch typically employ motors, gears and control systems to represent the analog qualities of touch. The number of components increases the weight of the device and makes them more suitable for stationary than mobile devices. Also, these mechanical components often wear out with use. Other possible means of applying forces, such as shape memory alloys and magnetofluids, were also rejected due to expected practical problems with precision control of actuation, necessary operating conditions (temperature and sealing of components) and their relatively high cost. In the preferred embodiment, vibration is used to represent the analog pressure of touch. Vibrating objects are easier to hold than objects that have pushing or moving components. Currently, vibration is implemented in many commercial communication devices to alert the user when an incoming call arrives. These devices often use pager motors that pulse on and off at a fixed frequency.

Touch (pressure) to vibration mapping is used. A person using the device sends an outgoing signal by squeezing or pressing. The resulting variations in the applied pressure of touch are converted to corresponding variations in the intensity of vibration perceived by the receiver. In addition, the preferred embodiment incorporates a vibratory feedback channel to provide the sender with a direct indication of the nature of the signal that will be felt by the receiver. As a result, the device allows the user to control the intensity of the output signal and to gauge the intensity of that signal as it will be received.

A haptic communications device implementing the invention thus preferably has the following features:

1. Users send data by applying pressure at their fingertips and receive data in the form of vibrations. The intensity of the received vibration is related to the intensity of the pressure applied by the sender.

2. Both the input and output areas are localized on the hand and positioned such that hand does not have to do too much work.

3. The device is constructed of inexpensive, robust components that that can withstand fatigue, wear and tear.

4. The device should be small enough for discreet use and mobility, small enough to fit in the hand, and be easy to carry.

Generating, Transmitting and Receiving Touch Signals

Figure 4:
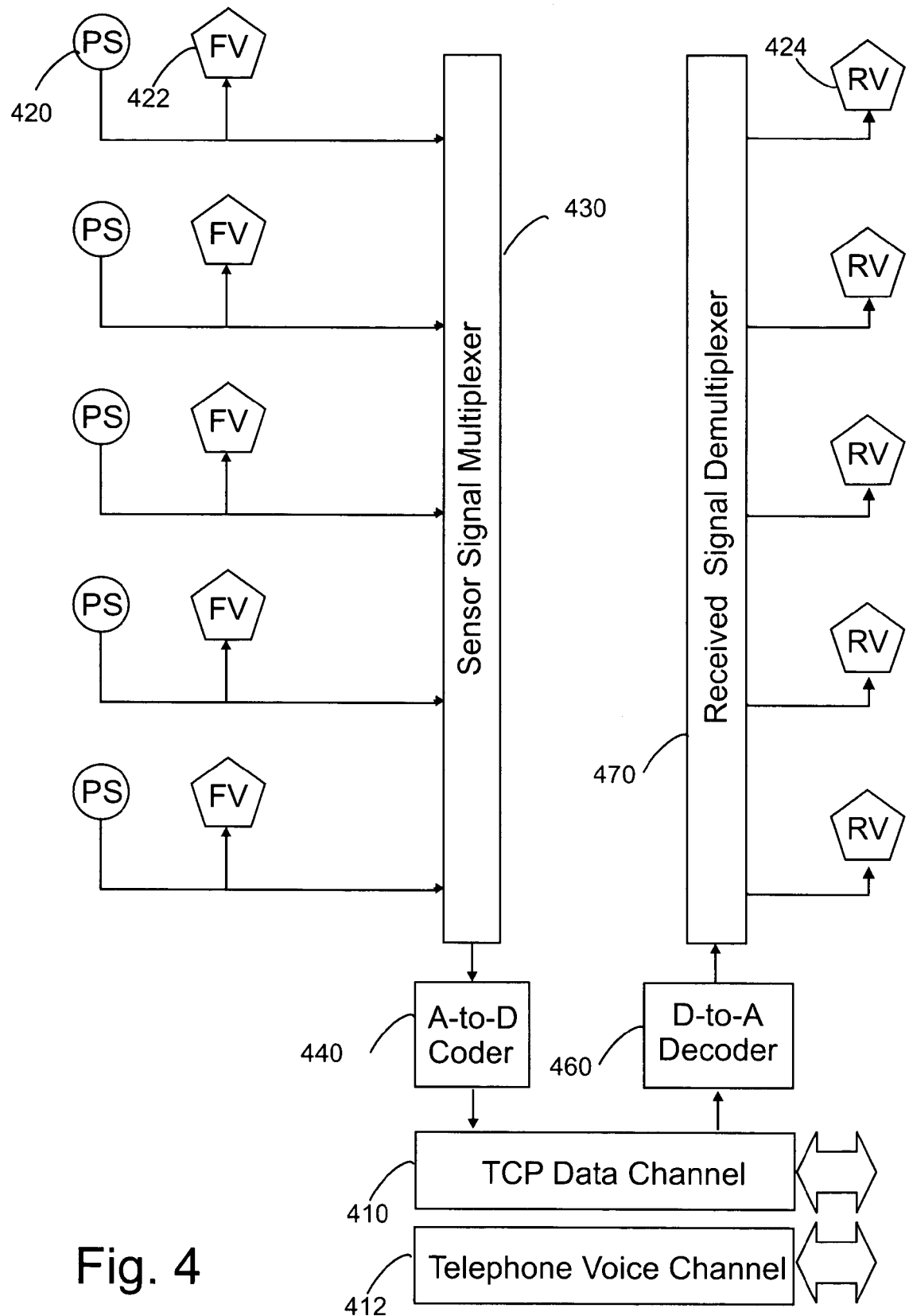
FIG. 4 is a block diagram illustrating the principle components of a touch signaling device used to implement the invention.
Figure 5:
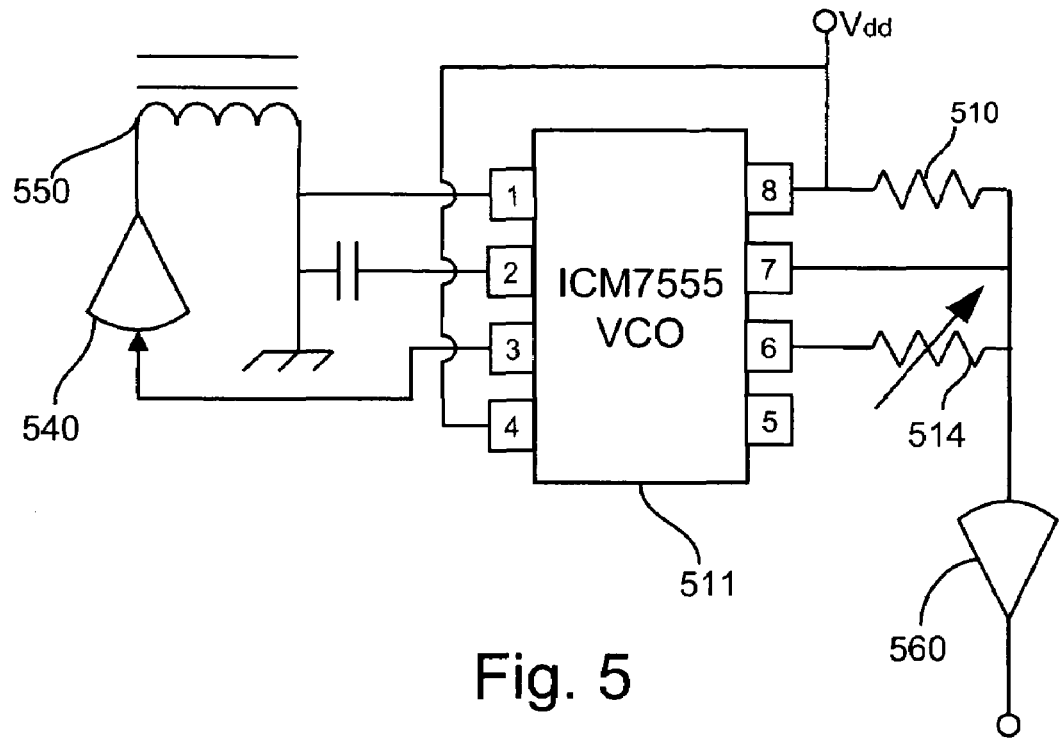
FIG. 5 is a more detailed schematic diagram of a pressure sensor and feedback vibrator circuit used in the device of FIG. 4.
Figure 6:
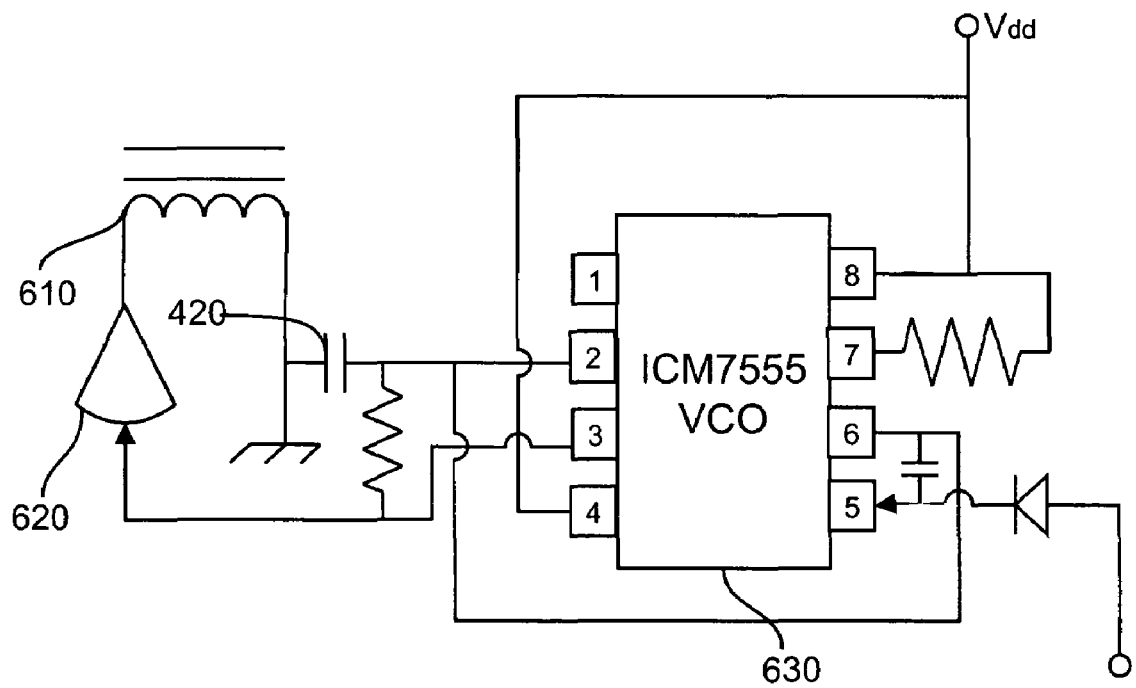
FIG. 6 is a more detailed schematic diagram of a receiving vibrator circuit used in the device of FIG. 4.

FIGS. 4–6 show the manner in which the principles of the invention may be applied to provide touch signal transmission and reception which enhances the communication between parties to a cellular phone conversation. As seen in FIG. 4, the touch signals are transmitted as digital signal values in a TCP (Transmission Control Protocol) channel 410 that the two touch devices use to establish a connection and exchange streams of data in the same order in which they were sent. A digital cellular telephone, such as Motorola's iDEN i730 multi-communication device, is used to provide a conventional, bidirectional audio voice communications channel 412 as well as the additional TCP data communications channel 410 The iDEN i730 includes a built in processor with software support for the Java 2 Platform, Micro Edition, also known as the J2ME™ platform which enables developers to easily create a variety of applications, as described in the *i730 Multi-Communication Device J2ME™ Developer's Guide*, Motorola Corp. (2003).

As previously discussed, each of the five fingers of the user's hand is used as a touch communications site. As shown in FIG. 4, a fingertip pressure sensor 420, a feedback vibrator 422, and a receiving vibrator 424 are positioned at each finger. Each feedback vibrator 422 is directly connected to and generates a vibration whose intensity is controlled by the pressure sensor 420 on that finger. The analog signals from the pressure sensor 420 are applied via a multiplexer 430 to a shared analog-to-digital converter 440 which delivers a repeating sequence of five digital values, each of which indicates the amount of pressure applied by the fingertip of one of the five fingers. These five values are transmitted via the TCP data socket channel 410 to a like device at the remote receiving location.

At the receiving location, the digital values representing pressure intensities are converted into analog signal intensities by the shared digital-to-analog converter 460 which are distributed by a demultiplexor 470 to the corresponding receiving vibrators (for example, the receiving vibrator 424 seen in FIG. 4) which applies a vibratory stimulation to one of the fingers of the receiver's hand, as described in more detail in connection with FIG. 6.

The input pressure sensors (seen at 101 in FIG. 1, at 201–205 in FIG. 2, and at 420 in FIG. 4) can be implemented using a Force Sensing Resistor™ (FSR) seen at 510 in FIG. 5. The FSR 510 is a polymer thick film (PTF) device which exhibits a decrease in resistance with any increase in force applied to the active surface whose force sensitivity is optimized for use in human touch control of electronic devices. An FSR can be as small as 0.2"×0.2" (0.5×0.5 cm) and have a thickness of 0.008" to 0.050". These devices are available from Interlink Electronics, Carpinteria, Calif. 93013. FSRs are sensitive enough to discern a range of pressures from approximately 0.45 psi (light squeeze) to 150 psi (hard squeeze).

The output transducers (seen at 121, 131 and 141 in FIG. 1, at 301–305 in FIG. 3, and at 422 and 424 in FIG. 4) preferably apply vibrations to the skin at a maximum frequency is 250 Hz to take advantage of the fact that the Pacinian corpuscles, the touch receptors that are sensitive to vibration, are most sensitive to vibrations of about 250 Hz. In addition, to provide adequate expression, the output transducer should have a high dynamic range. Dime-sized commercial acoustic speakers are suitable in range, and exhibit a response that quick and precise enough to represent subtle changes in the continuously varying input pressure signal. The model V1220 micro speaker from AudioLogic Engineering, used commercially in devices for the hearing impaired, may be employed to provide the desired vibratory stimulation. In the arrangements shown in FIGS. 5 and 6, a touch-to-vibration mapping is implemented using a voltage controlled oscillator (VCO) circuit.

As seen in FIG. 5, a VCO is implemented using an Intersil ICM7555 CMOS RC timer integrated circuit 511 connected to operate as an astable oscillator as described in the ICM7555,7556 Data Sheet FN2867.6, Intersil (November, 2002). The FSR 510 is serially connected with a second resistor 532 between pins 6 and 8 of the IC 511, and pin 7 is connected to the junction of resistor 532 and FSR 510. A 50% duty cycle square wave signal on output pin 3 is amplified by an amplifier 540 and applied to energize an AudioLogic V1220 microspeaker 550. Pins 4 and 8 are connected to a source of an operating potential $V_{dd}$. When the FSR 510 is pressed, the operating frequency of the IC 411 changes. The VCO is configured so that the maximum pressure applied to the FSR produces a maximum frequency of 250 Hz.

Note that the vibrotactile speakers are designed to have a very narrow frequency response, and the amplitude of the output vibration signal drops off sharply as the input frequency moved away from 250 Hz, providing an effective way to create an amplitude envelope in response to changes in pressure on the FSR.

The receiving vibrator is also implemented with an AudioLogic V1220 micro speaker as seen at 610 in FIG. 6. The vibrator 610 is driven by an amplifier 620 connected to the output pin 3 of an ICM7555 IC 630. The frequency of oscillation of the IC 630 is controlled by a voltage applied to pin 5. A holding capacitor 640 retains the voltage level which is applied periodically from the D-to-A converter (seen at 450 in FIG. 4) so that the frequency of the IC 630 increases toward 250 Hz to indicate increasing pressure applied by the corresponding fingertip of the human user of the remotely located touch transmitting device.

Ergonomic Considerations

An ergonomic form factor is desired for the handheld device. The device should feel comfortable and not obstruct the natural functions of the hand. In particular, the device should allow communication only when intended. For example, a user might send a squeeze signal when they are simply trying to hold the device. A strap (not shown) may be used for supporting the device in the user's hand, or an on/off switch may be used so that tactile communication will occur only when intended by the user. Another solution would be to decrease the sensitivity of the input circuit so that gentler pressures required to grip the device are omitted in the tactile communication channel. By reducing the number of channels, some of the fingers, particularly those with less motor control such as the ring and pinky fingers, can be devoted to holding the device rather than to touch communication.

It was observed that people used their index fingers to position a mobile phone, allowing them to more easily hold the earpiece against the ear, and point the other end toward their mouth. As illustrated in FIGS. 2 and 3, the shape of the hand piece preferably conforms to the anatomical shape of the hand with the index finger over the top of the hand piece, and forms indented recesses which received and guide the fingers into proper position with respect to the fingertip pressure sensor, the feedback vibrator and the receiving vibrator.

The Nature of Vibration

Masking and isolation of the vibration signals is a problem due to the compact size and localization of outputs onto a small device and contact area with the skin. The device was designed to allow 10 independent vibration signals to contact different areas of the hand. It would be hard to feel the vibration of one actuator when there are nine others nearby whose vibrations can couple either through the device or through the bones in the hand. The desired vibrations are between the fingers and the buttons while undesired transmission of vibrations occur through the user's hand (via the bones) and the structural body of the device. It is accordingly desirable to select material having desired vibratory transmission properties to surrounding the actuators. Rigid materials transmit vibration while elastic materials dampen vibration. It is important that the material inside the structure be strong enough to position the vibrations correctly, yet soft enough to dampen the vibration, isolating the vibration locally under each finger. By encasing the vibrators in foam or other elastic material, the transmission of vibrations through the body of the hand piece may be reduced. A structural device body may thus be made of rigid plastic or the like, with the vibrators being secured to the body by elastic mounting means.

The constraint of having three points of contact on the device would cause problems with users of different sized hands. Users with small hands would have trouble applying the maximum pressure and being able to position their hand over the reception area at the same time. The mechanics of the finger necessitate that when the sensor is pressed with the fingertip, the rest of the finger must lift off the vibrating areas slightly. This lessens the ability of the user to sense the vibrations. By providing a curved and formfitting surface, the fingers may be guided to maintain contact with the speakers even though the fingertip is pressing on the squeeze sensor. The handheld device illustrated in FIGS. 1–3 accordingly integrates the form design with the vibrotactile interaction. Notice that this reduces the number of contact points for the finger. The device affords the precision grip that is small enough to grab single-handedly and allows each finger to press independently.

Due to the constraint of the handheld surface, the location of the input force sensor and output vibrators must be located at three different points of where each finger rests on the device when gripped. To achieve this, the input force sensor and output of the feedback signal are both positioned at the fingertip, while the receiving vibrator is placed toward the base of the finger. In this way, both vibrators remain in contact with the finger's natural curvature as it is flexed, and the two vibrators are space apart so that the user can distinguish between feedback vibrations indicating action by the user, and received vibrations indicating action by the remote user.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. The method for communicating between a human sender and a human receiver comprising, in combination, the steps of:

at the human senders location, employing an actuator manipulated by said human sender for generating a communications signal having characteristics chosen by said human sender, said actuator comprises at least two spaced-apart sensors operated by said sender at said senders location, employing a first tranducer to translate said communications signal into a corresponding spaced-apart vibratory stimulation perceivable to the sender, transmitting said communications signal from said sender's location to the human receivers location, and at said human receiver's location, employing a second transducer for translating said communications signal into corresponding spaced-apart vibratory stimuli perceivable to said human receiver.

2. The method for communicating between a human sender and a human receiver as set forth in claim 1 wherein said actuator comprises at least one input device operated by said sender for sending a communications signal consisting of a sequence of signaling events and wherein said transducer converts said communications signal into a corresponding time sequence of vibratory stimuli.

3. The method for communicating between a human sender and a human receiver as set forth in claim 1 wherein said actuator is operated by one or more of the sender's fingers and wherein said second transducer applies corresponding vibratory stimulation to the receiver's fingers.

4. The method for communicating between a human sender and a human receiver as set forth in claim 3 wherein said communications signal indicates the operation of said sensor by two or more of the sender's fingers and wherein said second transducer applies vibratory stimuli to the corresponding two or more of the receiver's fingers.

5. The method for communicating between a human sender and a human receiver as set forth in claim 4 wherein, at the sender's location, said first transducer is employed to translate said communications signal into a corresponding vibratory stimulation at the corresponding two or more of the sender's fingers.

6. A tactile communications system comprising, in combination,
an actuator responsive to manipulation by a human sender at a sending location for generating an output signal indicative of the nature of said manipulation,
a vibration source at said sending location for producing feedback vibrations perceptible to said human sender which are indicative of the nature of said manipulation by said human sender
a transmission channel for conveying said signal from said sending location to a remote location, and
a vibration source at said remote location for receiving said signal via said transmission channel and producing vibrations perceptible to a human receiver which are indicative of the nature of said manipulation by said human sender.

7. A tactile communications system as set forth in claim 6 wherein said actuator comprises at least one pressure sensor for producing said signal in response to pressure applied by said human sender.

8. A tactile communications system as set forth in claim 7 wherein the intensity of said vibrations produced by said vibration source at said remote location corresponds to the magnitude of said pressure applied by said human sender.

9. A tactile communications system as set forth in claim 6 wherein said output signal is indicative of manipulation by said human sender at a first set of different positions and wherein said vibration source produces vibrations which are perceptible by said human receiver at a second set of different positions at said remote location which correspond to said first set of different positions.

10. A tactile communications system comprising, in combination,
at a transmitting location, one or more pressure sensors for detecting variations in the amount of pressure applied by the fingers of a human sender's hand, said one or more pressure sensors producing continuous, time-varying signal values indicative of said variations in said amount of pressure,
a transmission channel for transmitting said time-varying signal values to a receiving location, and
one or more receiving vibrators located at said receiving location and responsive to said time-varying signal values for applying vibratory stimuli to the fingers of a human receiver's hand, said vibratory stimuli having a variable intensity corresponding to said variations in said amount of pressure applied by the fingers of said human sender's hand.

11. The tactile communications system set forth in claim 10 wherein said pressure transducers and said receiving vibrators are positioned on the surface of a touch responsive telephone handset to engage with the fingers of said human sender's hand, and wherein said transmission channel is a telephone communication channel connecting said touch responsive telephone handset to a like remotely located telephone handset held by said human receiver's hand.

12. The tactile communication system set forth in claim 11 further comprising one or more feedback vibrators positioned on the surface of said touch responsive handset for applying vibratory stimuli to the fingers of said human sender's hand which simulate the vibratory stimuli applied the fingers of the human receiver's hand at said receiving location.

* * * * *